United States Patent
Kim

(10) Patent No.: US 7,380,623 B2
(45) Date of Patent: Jun. 3, 2008

(54) COOLING STRUCTURE FOR ENGINE EXHAUST SYSTEM

(75) Inventor: Pan-Sang Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 357 days.

(21) Appl. No.: 11/246,388

(22) Filed: Oct. 7, 2005

(65) Prior Publication Data

US 2006/0075746 A1 Apr. 13, 2006

(30) Foreign Application Priority Data

Oct. 8, 2004 (KR) .................. 10-2004-0080184

(51) Int. Cl.
*B60K 11/08* (2006.01)
*B60K 11/00* (2006.01)

(52) U.S. Cl. .................. 180/68.1; 180/68.2; 180/69.1; 296/180.1

(58) Field of Classification Search ............... 180/68.1, 180/68.2, 69.1; 296/180.1, 184.1, 187.01, 296/187.08, 193.07, 199, 204, 208, 38; 280/850
See application file for complete search history.

(56) References Cited

U.S. PATENT DOCUMENTS

| | | | | |
|---|---|---|---|---|
| 1,934,385 A | * | 11/1933 | Strauss .................. 180/89.1 |
| 3,696,730 A | * | 10/1972 | Masuda et al. ......... 237/12.3 A |
| 4,119,339 A | * | 10/1978 | Heimburger ............ 296/180.5 |
| 4,460,055 A | * | 7/1984 | Steiner ................... 180/7.1 |
| 4,558,897 A | * | 12/1985 | Okuyama et al. ....... 296/180.5 |
| 4,615,500 A | * | 10/1986 | Layson .................. 248/65 |
| 4,730,852 A | * | 3/1988 | Arscott .................. 285/15 |
| 4,810,021 A | * | 3/1989 | Burst .................... 296/180.1 |
| 4,925,231 A | * | 5/1990 | Hamaguchi ............. 296/78.1 |
| 4,976,489 A | * | 12/1990 | Lovelace ................ 296/180.1 |
| 5,042,870 A | * | 8/1991 | Yura .................... 296/180.1 |
| 5,073,353 A | * | 12/1991 | Florian .................. 422/310 |
| 5,102,187 A | * | 4/1992 | Harasaki ................ 296/204 |
| 5,174,406 A | * | 12/1992 | Lee ..................... 180/68.2 |
| 5,322,340 A | * | 6/1994 | Sato et al. .............. 296/180.1 |
| 5,490,572 A | * | 2/1996 | Tajiri et al. ............. 180/65.1 |
| 5,511,847 A | * | 4/1996 | Weisbarth et al. ....... 296/180.1 |
| 5,513,893 A | * | 5/1996 | Nakata et al. ........... 296/180.1 |
| 5,775,450 A | * | 7/1998 | Porter et al. ............ 180/68.1 |
| 5,813,491 A | * | 9/1998 | Sato et al. .............. 180/309 |
| 6,070,933 A | * | 6/2000 | Tsukidate et al. ....... 296/180.1 |
| 6,428,046 B1 | * | 8/2002 | Kocer et al. ............ 280/781 |
| 6,663,171 B2 | * | 12/2003 | Hashirayama et al. ... 296/204 |
| 2005/0212334 A1 | * | 9/2005 | Murata et al. .......... 296/204 |
| 2006/0284449 A1 | * | 12/2006 | Miyahara ............... 296/204 |

* cited by examiner

*Primary Examiner*—Christopher Ellis
*Assistant Examiner*—Vaughn T Coolman
(74) *Attorney, Agent, or Firm*—Morgan Lewis & Bockius LLP

(57) ABSTRACT

An exhaust system of an engine, wherein the intake system faces the cooling fan placed at the front of the vehicle while the exhaust system faces the dash panel placed at the rear of the vehicle, is provided with air from the cooling fan and air from the outside due to the vehicle motion through a deflector and space formed below a portion of the exhaust system, thereby preventing heat damage of the engine exhaust system and deterioration of the appearance of the vehicle, and minimizing the air drag coefficient of the vehicle.

6 Claims, 2 Drawing Sheets

COOLING STRUCTURE FOR ENGINE EXHAUST SYSTEM

CROSS-REFERENCE TO RELATED APPLICATIONS

The present application is based on, and claims priority from, Korean Application Serial Number 10-2004-0080184, filed on Oct. 8, 2004, the disclosure of which is hereby incorporated by reference herein in its entirety.

FIELD OF THE INVENTION

The present invention relates to a cooling structure that prevents the engine exhaust system from overheating. More particularly, the present invention relates to a cooling of the exhaust system in an intake/exhaust reverse engine disposed toward the dash panel placed at the back of the engine compartment instead of toward the cooling fan placed at the front of the engine compartment.

BACKGROUND OF THE INVENTION

The exhaust system of an engine is generally situated toward the front of the engine compartment where the cooling fan is positioned, while the intake system is situated toward the dash panel that divides the driver's seat and engine compartment.

The intake system of an intake/exhaust reverse engine is, however, placed to face the cooling fan, while the exhaust system is placed toward the dash panel. Therefore, the cooling air blown from the cooling fan may not smoothly be delivered to various sensors (i.e., oxygen sensor, or the like), wiring harness of the sensors, catalytic converter, and the like that all constitute the exhaust system, thereby causing heat damage to primary components of the exhaust system. In particular, if the oxygen sensor directly affecting the discharge of the exhaust gas gets too hot, the amount of exhaust gas exceeds the reference value compared to that of the vehicle exhaust gas regulation.

Thus, some vehicles are formed with holes at their hoods to enable air to be circulated from the upper surface of the hood during vehicle motion to the periphery of the engine exhaust system. However, in such construction, the holes on the hood may degrade the appearance of the vehicle.

SUMMARY OF THE INVENTION

Embodiments of the present invention help to prevent excessive heat of an engine exhaust system located toward the dash panel in a vehicle having an intake/exhaust reverse engine.

A cooling structure for an exemplary engine exhaust system according to one embodiment of the invention includes a deflector installed underneath the exhaust system in an intake/exhaust reverse engine in which the engine intake system is disposed toward a cooling fan placed at the front of the vehicle, while the engine exhaust system is disposed toward a dash panel. A space is formed in front of the deflector for communicating the engine compartment with the outside of the vehicle.

BRIEF DESCRIPTION OF THE DRAWINGS

For a better understanding of the nature and objects of the present invention compartment, reference should be made to the following detailed description with the accompanying drawings, in which.

DETAILED DESCRIPTION OF THE PREFERRED EMBODIMENTS

Figure 1:
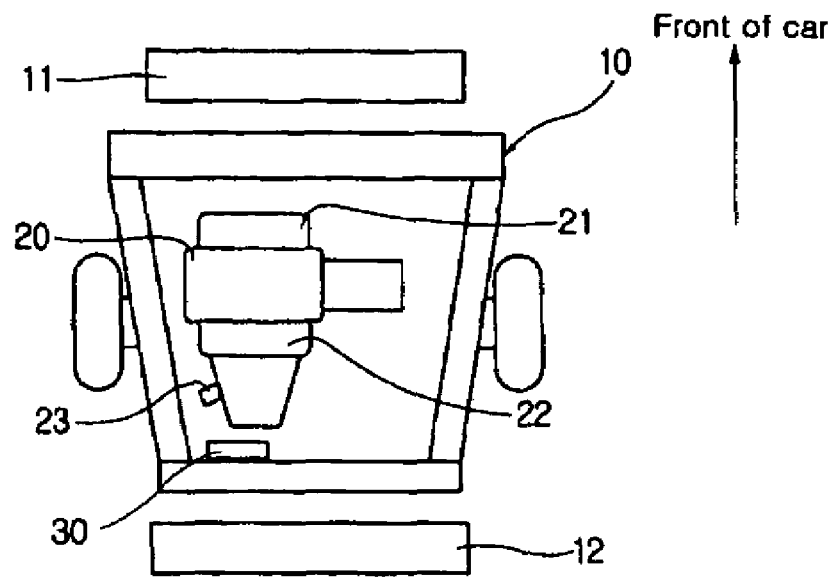
FIG. 1 is a schematic view illustrating a deflector according to an embodiment of the present invention.
Figure 2:
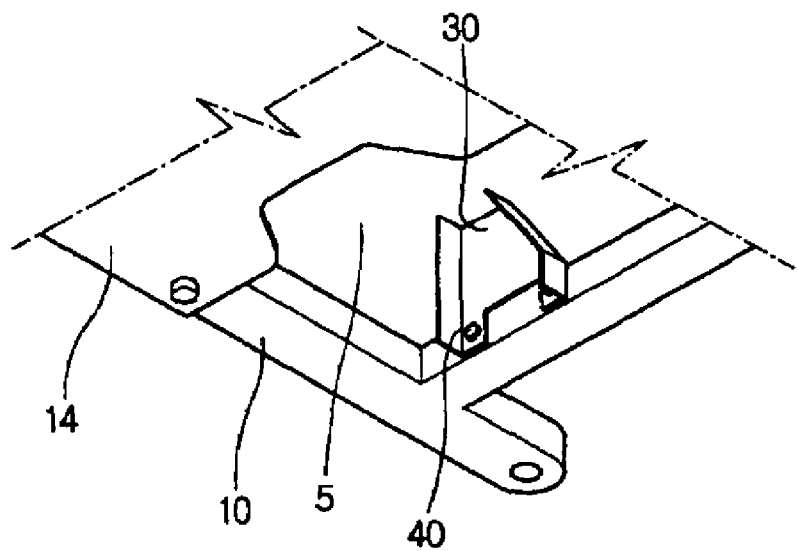
FIG. 2 illustrates a mounted state of a deflector when observed from the bottom of the vehicle according to an embodiment of the present invention.

With reference to FIGS. 1 and 2, an engine 20 includes an intake system 21 located toward a cooling fan 11 placed at the front of the vehicle, while an exhaust system 22 is located toward a dash panel 12 placed at the rear of the vehicle. Exhaust system 22 is mounted with an oxygen sensor 23.

Engine 20 is installed at the below portion thereof with a sub-frame 10 having a hollowed out quadrilateral shape. Sub-frame 10 supports engine 20; however, the supporting structure is omitted in the drawing.

A deflector 30 is mounted underneath exhaust system 22 in the intake/exhaust reverse engine, and a space 5 is formed in front of deflector 30 for communicating the engine compartment (where exhaust system 22 is situated) with the outside of the vehicle bottom portion.

Thus, the air from cooling fan 11 and from the bottom portion of the vehicle while the vehicle is in motion flow to the periphery of exhaust system 22 by deflector 30. Space 5 is formed by an under-cover 14 that is installed at the bottom of sub-frame 10 for enclosing the bottom of the engine compartment.

Figure 3:
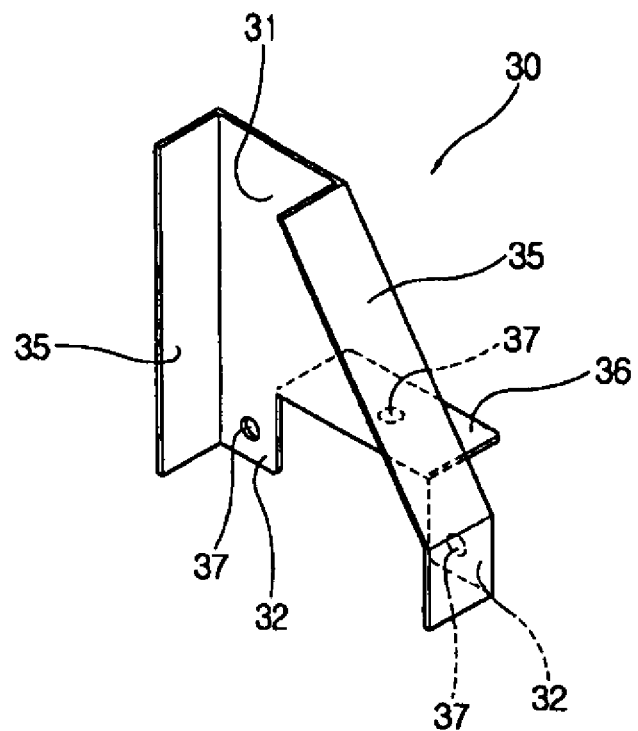
FIG. 3 is a perspective view of a deflector according to an embodiment of the present invention.
Figure 4:
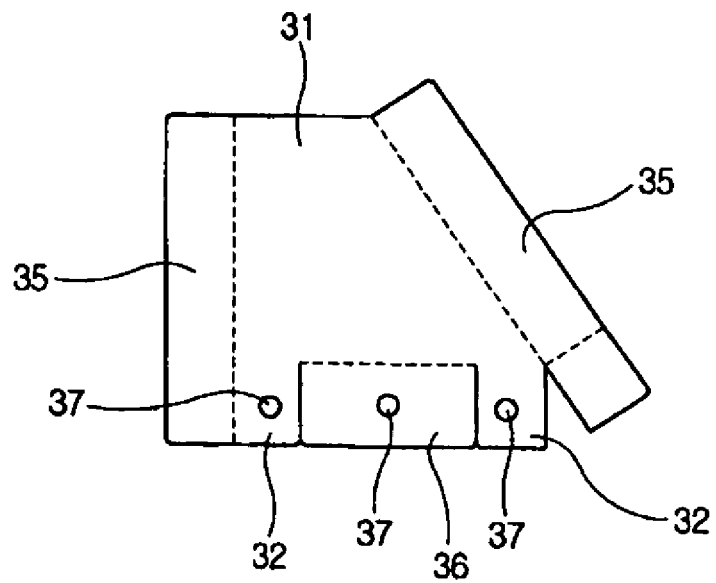
FIG. 4 is a plan view of a deflector according to an embodiment of the present invention.

Deflector 30 fixed at a rear segment of sub-frame 10 includes a base 31, which faces the front of the vehicle (see FIGS. 3 and 4). Lower wings 32 extend from the bottom of base 31 and couple to a vertical surface of the above segment of sub-frame 10. A rear wing 36 is horizontally formed at the rear of base 31 for being coupled to a horizontal surface of the segment of sub-frame 10.

Lower wings 32 and rear wing 36 are conjoined perpendicularly such that deflector 30 can be fixed at sub-frame 10 with lower wings 32 together with rear wing 36 covering an edge of sub-frame 10 simultaneously. Base 31 is formed at both sides thereof with guides 35 that protrude toward the front of the vehicle. The width between both guides 35 narrows from the bottom toward the top of the base.

In one embodiment of the present invention, one of both guides 35 is inclinedly formed for allowing the width between guides 35 to be narrowed down from the bottom to the top thereof. Deflector 30 is integrally formed with base 31, lower wings 32, rear wing 36, and guides 35 by a sheet metal process (see FIG. 4). Lower wings 32 and rear wing 36 have coupling holes 37 for securing deflector 30 at sub-frame 10 via screws.

In the cooling structure for an engine exhaust system according to such an exemplary embodiment, air generated from cooling fan 11 moves to the space between the lower portion of engine 20 and under-cover 14. Then, the air is induced, via deflector 30, into exhaust system 22 placed at the upper portion of deflector 30 for cooling exhaust system 22. Further, when the vehicle is in motion, the wind around the lower portion of the vehicle is drawn to exhaust system 22 through space 5 via deflector 30 to thereby cool exhaust system 22.

The lower portion of the engine compartment is shrouded by under-cover 14 in the present embodiment, thus improving the appearance of the bottom of the vehicle and preventing the engine compartment from being contaminated. Under-cover 14 forms space 5 for guiding, via deflector 30, the cooling air into exhaust system 22 through the space 5, thereby effectively removing heat from exhaust system 22.

Even if the vehicle has no under-cover, the air from the vehicle movement and air from cooling fan 11 decrease the heat of exhaust system 22 due to the installation of deflector 30 at the lower portion of exhaust system 22.

Various sensors including oxygen sensor 23, wiring harness for those sensors, catalytic converter, and the like that all constitute exhaust system 22 are prevented from heat damage by the above effective cooling of exhaust system 22. Moreover, no hole is required on the hood, thus avoiding the deterioration of the vehicle appearance and minimizing the air drag coefficient (CD) of the vehicle.

As apparent from the foregoing, there is an advantage in that the exhaust system of an intake/exhaust reverse engine is provided with air from the cooling fan and from outside of the vehicle through the deflector and space formed at the below portion of the exhaust system, thereby preventing heat damage of the engine exhaust system and deterioration of the appearance of the vehicle, and minimizing the air drag coefficient.

What is claimed is:

1. A cooling structure for an engine exhaust system, comprising:

a deflector installed underneath the exhaust system in an intake/exhaust reverse engine in which an engine intake system is disposed toward a cooling fan placed at a front of the vehicle, and the engine exhaust system is disposed toward a dash panel; and a space formed in front of said deflector communicating between an engine compartment, where said exhaust system is located, and an outside of the vehicle bottom portion;

wherein said deflector has a base, which faces the front of the vehicle, and said space is formed at least in part by an under-cover that encloses a bottom surface of the engine compartment;

wherein said engine is installed at the bottom thereof with a sub-frame having a hollowed quadrilateral figure, said deflector is fixed at a rear segment of said sub-frame, and said under-cover is installed at a bottom of said sub-frame;

wherein said deflector includes:

lower wings that extend from a bottom of said base and couple to a vertical surface of the rear segment of said sub-frame; and a rear wing that is horizontally formed at a rear of said base for being coupled to a horizontal surface of the rear segment of said sub-frame.

2. The structure as defined in claim 1, wherein said lower wings and said rear wing are conjoined perpendicularly such that said deflector can be fixed at said sub-frame with said lower wings and rear wing covering an edge of said sub-frame simultaneously.

3. The structure as defined in claim 1, wherein said base is formed at both sides thereof with guides that protrude toward the front of the vehicle.

4. The structure as defined in claim 3, wherein a width between said both guides narrows from the bottom toward the top of said base.

5. The structure as defined in claim 3, wherein one of both guides is inclinedly formed for allowing the width between said guides to be narrowed from the bottom toward the top of said base.

6. The structure as defined in claim 3, wherein said deflector is formed by a sheet metal process.

\* \* \* \* \*